(12) United States Patent
Yaworski et al.

(10) Patent No.: US 9,627,101 B2
(45) Date of Patent: Apr. 18, 2017

(54) METHODS FOR COVERING AN ELONGATE SUBSTRATE

(71) Applicant: Tyco Electronics Corporation, Berwyn, PA (US)

(72) Inventors: Harry George Yaworski, Cary, NC (US); Edward O'Sullivan, Cary, NC (US); Mahmoud K. Seraj, Apex, NC (US); George W. Pullium, III, Garner, NC (US)

(73) Assignee: TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 14/947,703

(22) Filed: Nov. 20, 2015

(65) Prior Publication Data

US 2016/0078982 A1   Mar. 17, 2016

Related U.S. Application Data

(62) Division of application No. 13/758,532, filed on Feb. 4, 2013, now Pat. No. 9,224,522.

(51) Int. Cl.
*H01B 7/06* (2006.01)
*H01B 13/06* (2006.01)
(Continued)

(52) U.S. Cl.
CPC .............. *H01B 7/06* (2013.01); *B29C 61/065* (2013.01); *H01B 7/00* (2013.01); *H01B 13/062* (2013.01);
(Continued)

(58) Field of Classification Search
CPC ......... H01B 7/06; H01B 13/062; H01B 13/06
(Continued)

(56) References Cited

U.S. PATENT DOCUMENTS 3,040,121 A * 6/1962 Gillemot ................ H02G 15/18
174/138 F
3,161,210 A   12/1964 Loof
(Continued)

FOREIGN PATENT DOCUMENTS

EP   0 399 263 A2   11/1990
EP   0 399 263 A3   11/1990
(Continued)

OTHER PUBLICATIONS

"MOD-3-TFT, MOD 3Z, 3C, 3D Cold-applied, high-voltage termination modification kit for 3/C shielded and non-shielded power cables" *Tyco Electronics*, PII 55410, Rev AD, PCN F40796-000, Effective Date: Aug. 4, 2008 (6 pages).
(Continued)

*Primary Examiner* — Timothy Thompson
*Assistant Examiner* — Michael F McAllister
(74) *Attorney, Agent, or Firm* — Myers Bigel, P.A.

(57) ABSTRACT

A cover assembly for covering an elongate substrate includes a holdout device and a resilient, elastically radially expanded sleeve member. The holdout device includes a core having an axially extending slit defined therein and defining a core passage to receive the substrate, and a designated target region. The sleeve member defines an axially extending sleeve passage. The sleeve member is mounted on the core such that the core is disposed in the sleeve passage and the sleeve member exerts a radially compressive recovery force on the core. When the substrate is disposed in the core passage and a radially directed release force is applied to the target region, the core will reduce in circumference and collapse around the substrate under the recovery force of the sleeve member to a collapsed position.

19 Claims, 7 Drawing Sheets

(51) Int. Cl.
  *H01B 7/00* (2006.01)
  *B29C 61/06* (2006.01)
  *H02G 3/04* (2006.01)

(52) U.S. Cl.
  CPC ....... *H02G 3/0481* (2013.01); *Y10T 29/49117* (2015.01)

(58) Field of Classification Search
  USPC .......................................................... 174/93
  See application file for complete search history.

(56) References Cited

U.S. PATENT DOCUMENTS

| | | | |
|---|---|---|---|
| 3,357,457 A | | 12/1967 | Myer |
| 3,515,798 A | | 6/1970 | Slevert |
| 3,824,331 A | * | 7/1974 | Mixon, Jr. ............. F16L 21/005 174/135 |
| 3,878,320 A | * | 4/1975 | Mixon, Jr. ............. F16L 21/005 174/135 |
| 4,016,356 A | | 4/1977 | McLoughlin |
| 4,029,895 A | | 6/1977 | Scarborough |
| 4,070,746 A | | 1/1978 | Evans et al. |
| 4,084,067 A | * | 4/1978 | Gillemot ................ H02G 15/10 174/41 |
| 4,179,320 A | | 12/1979 | Midgley et al. |
| 4,233,731 A | | 11/1980 | Clabburn et al. |
| 4,410,009 A | | 10/1983 | Blum |
| 4,462,651 A | | 7/1984 | McGaffigan |
| 4,506,430 A | | 3/1985 | Guzay, Jr. |
| 4,559,973 A | | 12/1985 | Hane et al. |
| 4,885,432 A | | 12/1989 | Amoyal et al. |
| 5,030,487 A | | 7/1991 | Rosenzweig |
| 5,098,752 A | * | 3/1992 | Chang .................. B29C 31/002 156/85 |
| 5,280,136 A | | 1/1994 | Yaworski et al. |
| 5,365,020 A | | 11/1994 | Vallauri et al. |
| 5,380,224 A | | 1/1995 | DiCicco |
| 5,406,871 A | | 4/1995 | Lambert, Jr. |
| 5,495,650 A | | 3/1996 | Crepel et al. |
| 5,661,842 A | | 8/1997 | Faust |
| 5,670,223 A | | 9/1997 | Sadlo et al. |
| 5,753,861 A | | 5/1998 | Hansen et al. |
| 5,856,634 A | | 1/1999 | Borgstrom |
| 5,925,427 A | | 7/1999 | Sadlo et al. |
| 5,944,929 A | | 8/1999 | Vallauri et al. |
| 6,245,999 B1 | * | 6/2001 | Costigan ............... B29C 61/065 174/74 A |
| 6,444,913 B1 | | 9/2002 | Kao |
| 6,762,364 B2 | | 7/2004 | Hofmann et al. |
| 7,265,293 B2 | | 9/2007 | Kamel et al. |
| 2004/0016564 A1 | | 1/2004 | Lambert |
| 2010/0025076 A1 | * | 2/2010 | Pearce ................. H02G 3/0481 174/135 |
| 2011/0254197 A1 | | 10/2011 | Verner et al. |

FOREIGN PATENT DOCUMENTS

| | | |
|---|---|---|
| EP | 0750381 A1 | 12/1996 |
| EP | 0 767 523 A3 | 4/1997 |
| WO | WO 91/16564 A1 | 10/1991 |
| WO | WO 98/40941 A1 | 9/1998 |
| WO | WO 02/092328 A1 | 11/2002 |

OTHER PUBLICATIONS

"TFT-150E 15kV Cold Applied Termination System for Jacketed and Unjacketed Concentric Neutral Power Cables" *Tyco Electronics*, PII 55057, Rev AF, PCN 346641-000, Effective Date: Jul. 19, 2004 (5 pages).

"RRL Manufacturing Inspection Instruction, EPDM Breakout EXRM-1954-117/130, RRL/EOU/S007, QCTS S007," *Raychem RPG*, Mar. 5, 2010, 3 pages.

International Search Report and Written Opinion Corresponding to International Application No. PCT/US2014/013270; Date of Mailing: Nov. 6; 2014 (17 pages).

International Search Report and Written Opinion Corresponding to International Application No. PCT/US2014/013270; Date of Mailing: Jun. 11, 2014 (17 pages).

* cited by examiner

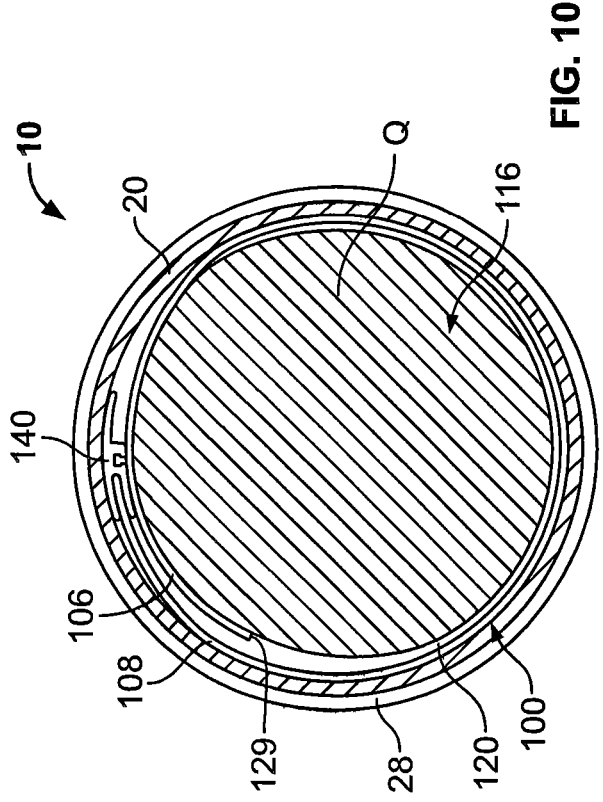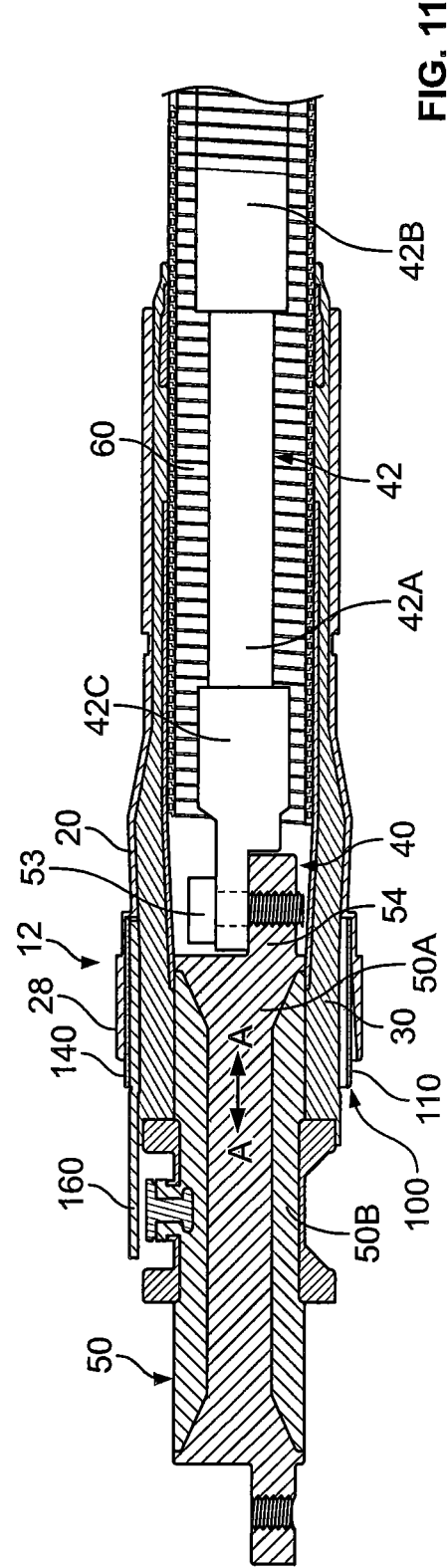

METHODS FOR COVERING AN ELONGATE SUBSTRATE

RELATED APPLICATION(S)

The present application is a divisional application of and claims priority from U.S. patent application Ser. No. 13/758,532, filed Feb. 4, 2013, the disclosure of which is incorporated herein by reference in its entirety.

FIELD OF THE INVENTION

The present invention relates to devices for applying a resilient sleeve onto an elongate substrate such as a cable and, more particularly, to holdout devices for applying a resilient sleeve onto an elongate substrate and cover assemblies and the methods incorporating holdout devices.

BACKGROUND OF THE INVENTION

Protective sleeves or covers are commonly installed on elongate substrates such as power distribution cables as well as other electrical cables. Such sleeves are commonly formed of an electrically insulative, polymeric material. Some known covers of this type are formed of a resilient, elastomeric material. In use, the sleeves are elastically stretched, placed about the substrate, and released, whereupon they recover to a reduced diameter to conform to or seal about the substrate. These sleeves may be referred to as cold-applied covers. It is generally necessary to expand the sleeve to a diameter sufficient to allow the sleeve to be slid onto the substrate. It is known to provide a holdout device or sleeve support in the sleeve to temporarily hold the sleeve in the expanded state. The holdout and the sleeve are slid over the substrate and the holdout is then removed or collapsed to allow the sleeve to contract about the substrate. Known holdouts may suffer from various drawbacks.

SUMMARY OF THE INVENTION

According to embodiments of the present invention, a cover assembly for covering an elongate substrate includes a holdout device and a resilient, elastically radially expanded sleeve member. The holdout device includes a core having an axially extending slit defined therein and defining a core passage to receive the substrate, and a designated target region. The sleeve member defines an axially extending sleeve passage. The sleeve member is mounted on the core such that the core is disposed in the sleeve passage and the sleeve member exerts a radially compressive recovery force on the core. When the substrate is disposed in the core passage and a radially directed release force is applied to the target region, the core will reduce in circumference and collapse around the substrate under the recovery force of the sleeve member to a collapsed position.

According to method embodiments of the present invention, a method for covering an elongate substrate includes providing a cover assembly including a holdout and a resilient, elastically radially expanded sleeve member. The holdout device includes a core having an axially extending slit defined therein and defining a core passage to receive the substrate, and a designated target region. The sleeve member defines an axially extending sleeve passage. The sleeve member is mounted on the core such that the core is disposed in the sleeve passage and the sleeve member exerts a radially compressive recovery force on the core. The method further includes: mounting the cover assembly on the elongate substrate such that the elongate substrate extends through the core passage; and thereafter, with the substrate disposed in the core passage, applying a radially directed release force to the target region, responsive to which the core reduces in circumference and collapses around the substrate under the recovery force of the sleeve member to a collapsed position.

According to embodiments of the present invention, a cover assembly for covering an elongate substrate includes a holdout device and a resilient, elastically radially expanded sleeve member. The holdout device includes a core having an axially extending slit defined therein and defining a core passage to receive the substrate. The sleeve member defines an axially extending sleeve passage. The sleeve member is mounted on the core such that the core is disposed in the sleeve passage and the sleeve member exerts a radially compressive recovery force on the core. When the substrate is disposed in the core passage and a radially directed release force is applied to the holdout device, the core will reduce in circumference and collapse around the substrate under the recovery force of the sleeve member to a collapsed position. The release force applied to the holdout device causes an axially extending first edge of the core to slide beneath an opposing axially extending second edge of the core, thereby allowing the core to curl upon itself under the recovery force. The first edge is circumferentially loaded against the second edge by the recovery force, thereby creating a frictional resistance to disengagement between the first and second edges that is overcome by applying the release force to the holdout device. The first edge includes an engagement edge portion and a recessed edge portion. The engagement edge portion engages the second edge. The recessed edge portion is circumferentially spaced apart from the second edge.

According to embodiments of the present invention, a cover assembly for covering an elongate substrate includes a holdout device and a resilient, elastically radially expanded sleeve member. The holdout device includes a core and a status indicator. The core has an axially extending slit defined therein and defines a core passage to receive the substrate. The core is configured in a retaining position. The sleeve member defines an axially extending sleeve passage. The sleeve member is mounted on the core such that the core is disposed in the sleeve passage and the sleeve member exerts a radially compressive recovery force on the core. When the substrate is disposed in the core passage and a radially directed release force is applied to the holdout device, the core will reduce in circumference and collapse around the substrate under the recovery force of the sleeve member to a collapsed position from the retaining position. The status indicator is operative to indicate to a user whether the core is in the retaining position or, alternatively, the collapsed position.

Further features, advantages and details of the present invention will be appreciated by those of ordinary skill in the art from a reading of the figures and the detailed description of the embodiments that follow, such description being merely illustrative of the present invention.

BRIEF DESCRIPTION OF THE DRAWINGS

FIG. 10 is a lateral cross-sectional view of the cover assembly of FIG. 5 installed on a substrate.

FIG. 11 is a longitudinal cross-sectional view of the cover assembly of FIG. 5 being mounted on a disconnectable busbar joint.

DETAILED DESCRIPTION OF EMBODIMENTS OF THE INVENTION

Figure 1:
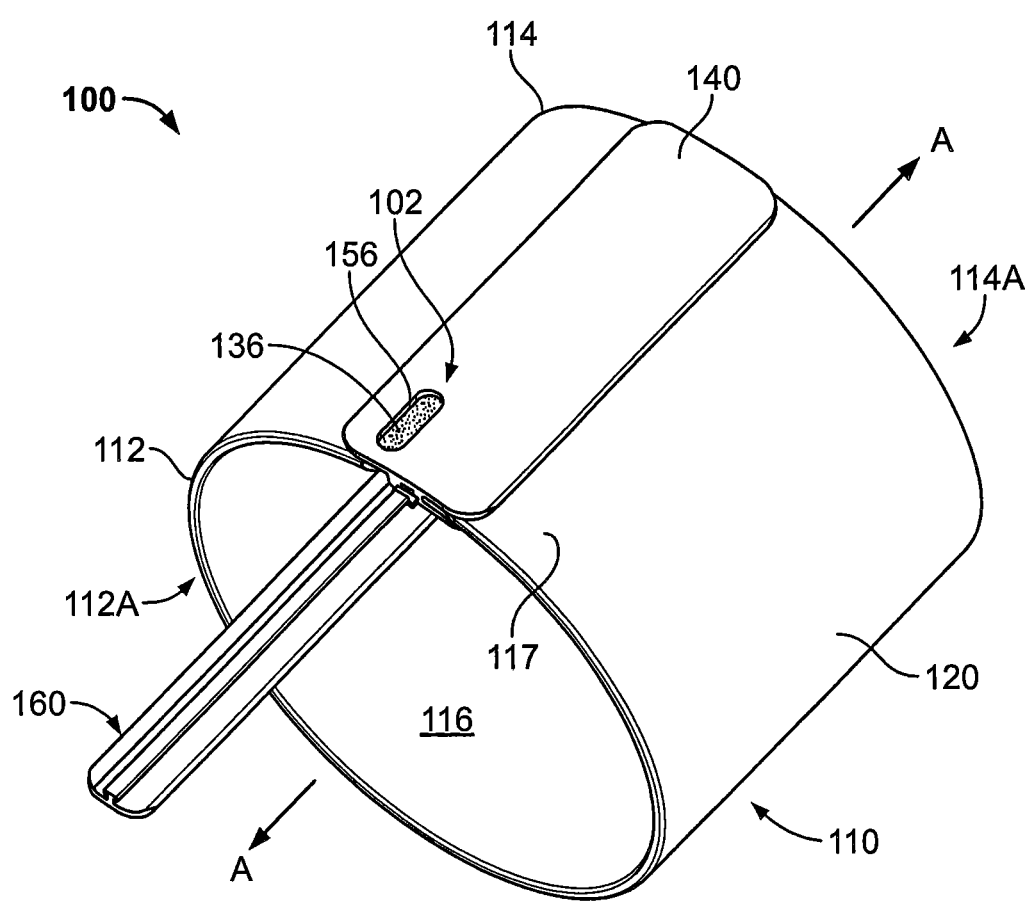
FIG. 1 is a perspective view of a holdout device according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, "monolithic" means an object that is a single, unitary piece formed or composed of a material without joints or seams.

With reference to FIGS. 1-11, a holdout device 100 according to embodiments of the present invention is shown therein. The holdout device 100 may be combined with a resilient outer sleeve member 20 (FIGS. 5 and 6) to form a cover assembly 10 wherein the holdout device 100 supports the sleeve member 20 in an expanded condition. The cover assembly 10 may be installed over an elongated substrate such as a cable connection (e.g., a cable termination 40 (FIG. 11) or a cable splice) or other cable assembly (e.g., a cable midsection) to protect the cable connection or other substrate. As discussed in more detail below, the cover assembly 10 may be slid over the cable connection 40, and the holdout device 100 may then be collapsed to allow the sleeve member 20 to contract about the cable connection 40. In some embodiments, the cover assembly 10 is used with an inner sleeve member 30 to form a composite cover assembly 12 (FIG. 11).

Turning to the sleeve member 20 (FIGS. 5 and 6) in more detail, the sleeve member 20 may be referred to as a cold recoverable sleeve, a cold applied sleeve or cold shrinkable sleeve. Generally, the sleeve member 20 is a tubular structure that is formed of elastomeric-like material or has elastomeric physical recovery properties so that, when the sleeve member 20 is radially stretched to an expanded position by a restraint and thereafter released from the restraint, the sleeve member 20 will recover or return to a smaller radius (i.e., a recovered position). In practice, a further restraint (e.g., a substrate) may prevent the sleeve member 20 from fully recovering to a relaxed state, so that the sleeve member 20 continues to exert a radially compressive force on the substrate in the recovered position.

Figure 6:
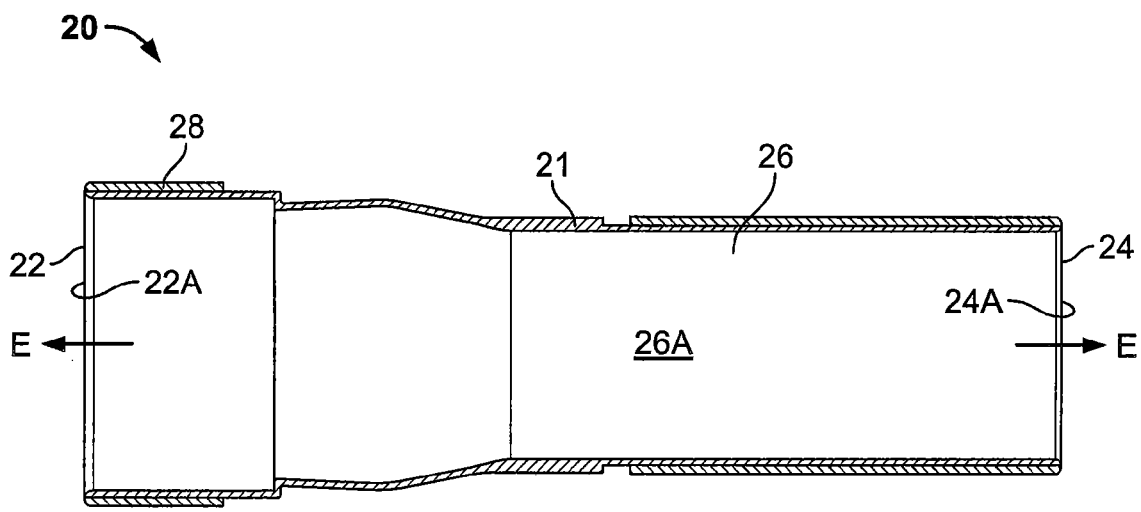
FIG. 6 is a longitudinal cross-sectional view of the sleeve member of FIG. 5.

With reference to FIG. 6, the sleeve member 20 has a lengthwise axis E-E and includes a body 21 having opposed ends 22 and 24. An inner surface 26 of the sleeve member 20 defines an axially extending inner passage 26A communicating with opposed end openings 22A and 24A. In some embodiments (not shown), the sleeve member 20 may further include a plurality of integral sheds extending radially outwardly from the body 21.

Figure 5:
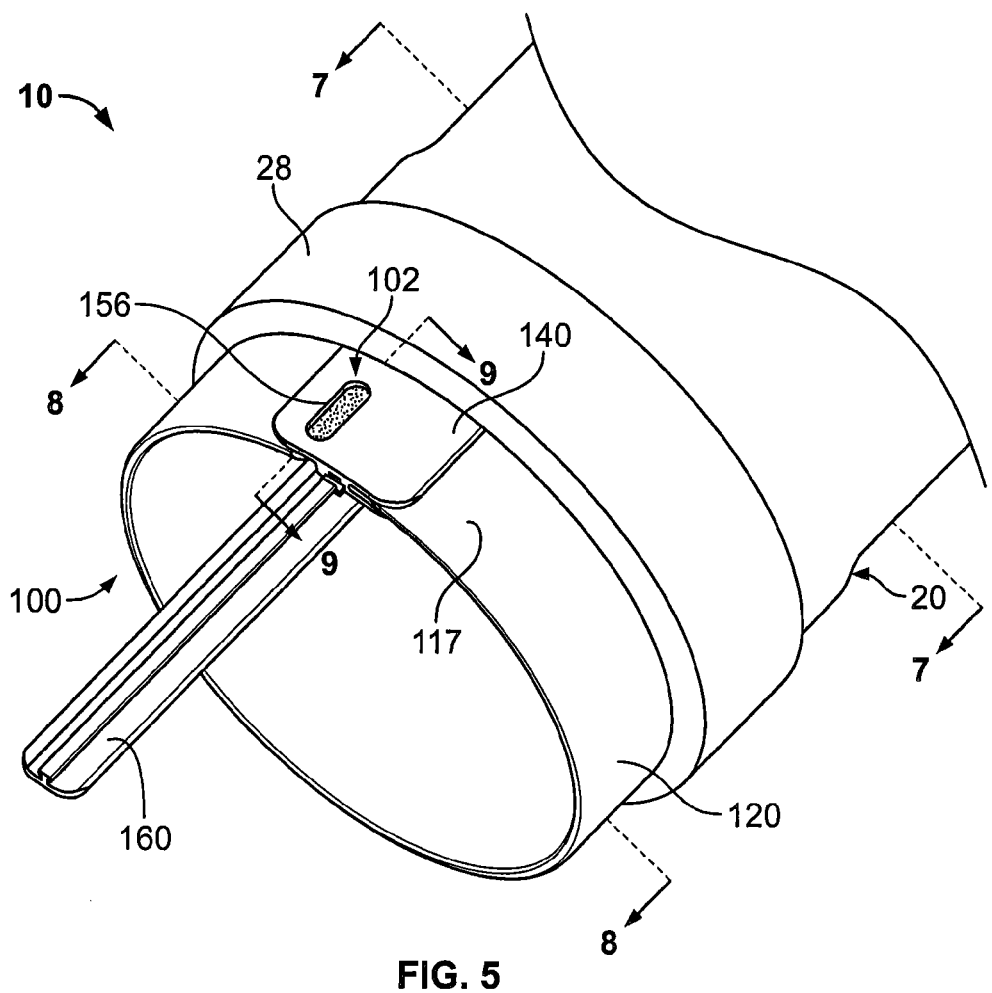
FIG. 5 is a fragmentary, perspective view of a cover assembly according to embodiments of the present invention including a sleeve member mounted on the holdout device of FIG. 1.

At least a portion of the body 21, and according to some embodiments substantially the entire body 21 is formed of a resilient, radially elastic material. That is, the body 21 can be stretched radially and to an expanded (i.e., radially enlarged)

condition as shown in FIGS. 5 and 11 and, upon release, will radially contract or recover to a partially or fully recovered condition having a smaller radius (e.g., as shown in FIG. 10). The body 21 may be formed of any suitable material. According to some embodiments, the body 21 is formed of an elastomeric material. Suitable elastomeric materials include natural and synthetic polyisoprenes, polybutadiene, styrene-butadiene rubber (SBR), butadiene-acrylonitrile rubber, polychlorophrene (Neoprene), butyl rubber, polysulfide, silicone rubber, urethane rubber, polyacrylate, epichlorohydrin homo and copolymers, propylene oxide rubber, fluorosilicone rubber, fluorocarbon rubber, chlorosulfonated polyethylene, chlorinated polyethylene, ethylene-propylene rubber.

With reference to FIGS. 1-4, 7 and 8, the holdout device 100 includes a core assembly or core 110 and a safety rail 160.

The core 110 defines a longitudinal axis A-A (FIG. 1) and has first and second opposed ends 112, 114. The core 110 defines an inner passage 116 extending from the end 112 to the end 114 and communicating with end openings 112A and 114A also defined by the core 110. An end section 117 extends axially outwardly beyond the ends 22 of the sleeve member 20 as shown in FIG. 5. According to some embodiments, the core 110 is generally cylindrical in shape.

The core 110 includes a tubular body member 120 and a closure member, support member, insert, retainer or retention member 140 (hereinafter referred to as the retention member 140). In the illustrated embodiment, the body member 120 and the retention member are separately formed and assembled; however, in other embodiments, features of the retention member 140 may be integrally formed with the body member 120 so that the core 110 is of a one piece construction. As described herein, the retention member 140 and the safety rail member 160 are combined to form a retainer assembly 111.

Figure 2:
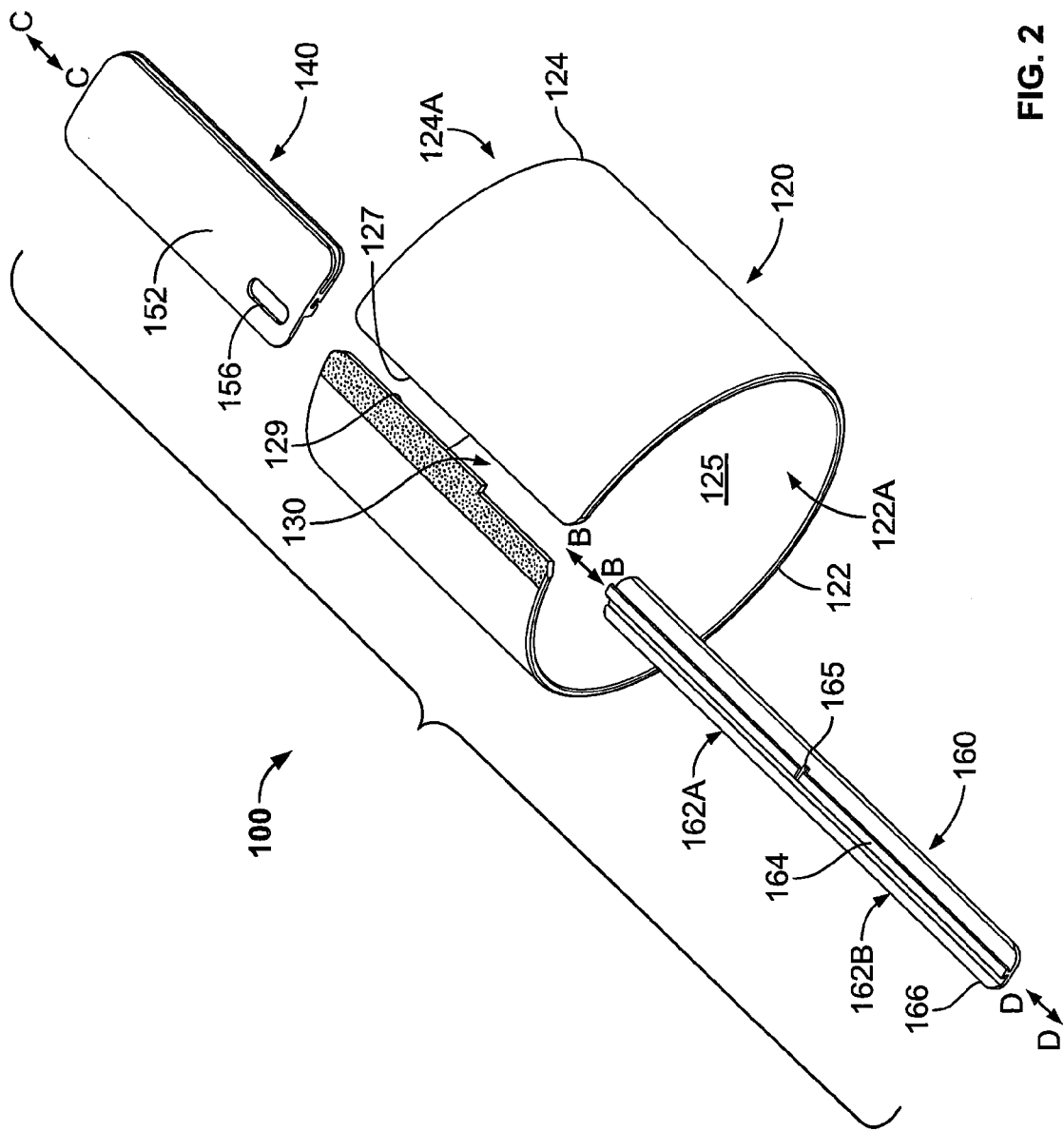
FIG. 2 is an exploded, perspective view of the holdout device of FIG. 1.
Figure 3:
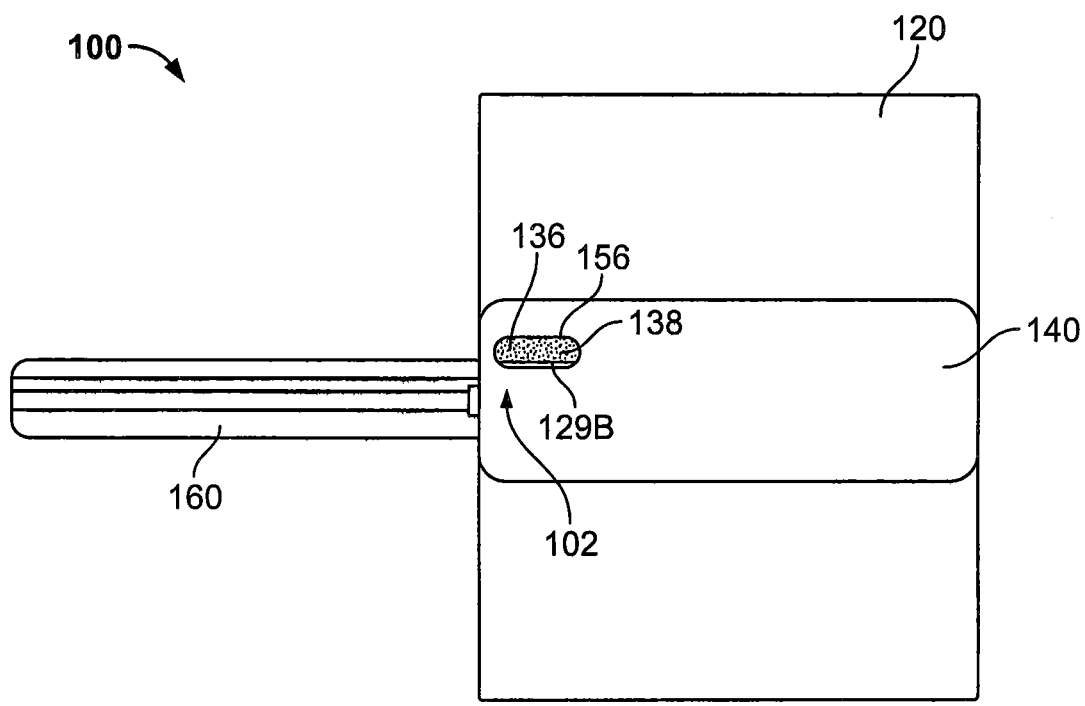
FIG. 3 is a top view of the holdout device of FIG. 1.
Figure 4:
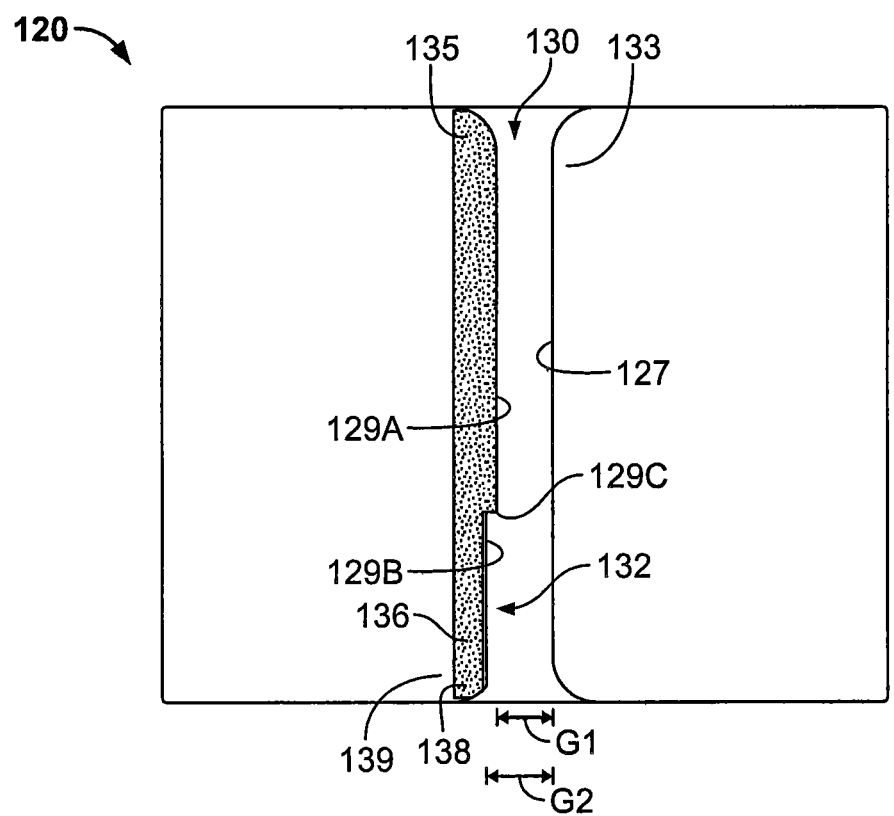
FIG. 4 is a top view of a body member forming a part of the holdout device of FIG. 1.

With reference to FIGS. 2 and 4, the body member 120 is generally cylindrical in shape and has axially opposed ends 122 and 124. The body member 120 defines opposed end openings 122A, 124A and an axially extending interior passage 125 terminating at the end openings 122A, 124A. Opposed, substantially parallel free edges 127 and 129 extend axially from end 122 to end 124. The free edges 127, 129 define an axial side slot or slit 130 that intersects each of the end openings 122A, 124B. The side slit 130 has a longitudinal slot axis B-B and extends continuously and completely from the end 122 to the end 124 and from the opening 122A to the opening 124A. The free edge 129 has an engagement edge segment or portion 129A and a recessed edge segment or portion 129B (FIG. 4). The engagement edge portion 129A begins at a lead end 129C. The recessed edge portion 129B defines a relief, cutout or recess 132. The recess 132 extends from the end 129C to the end 112. As a result, the slit 130 has a gap width G1 between the edge portion 129A and the edge 127, and a wider gap width G2 between the edge portion 129B and the edge 127. An edge section 133 of the body member 120 extends along the edge 127 and an edge section 135 extends along the edge 129.

As discussed hereinbelow, a designated target area or region 136 is located in the edge section 135. In some embodiments, an indicator 138 is located in the edge section 135 at or adjacent the target region 136. The indicator 138 may be, for example, a region having a color or pattern different and visually distinguishable from that of an adjacent region 139 (or the remainder) of the body member 120 more circumferentially distant from the edge 129B than the edge section 135.

Figure 7:
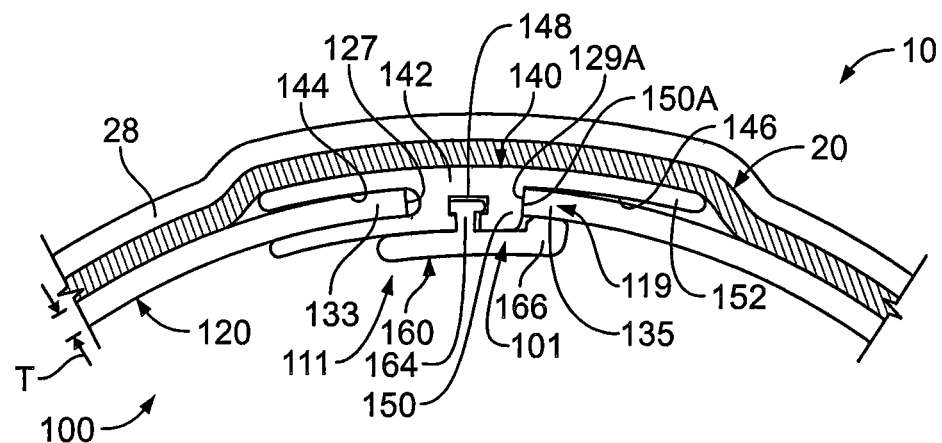
FIG. 7 is a fragmentary, cross-sectional view of the cover assembly of FIG. 5 taken along the line 7-7 of FIG. 5.

With reference to FIGS. 2 and 7, the retention member 140 is generally "h"-shaped in cross-section and has a lengthwise axis C-C. The retention member 140 includes a body 142, an axially extending, laterally opening "U"-shaped groove or channel 144 defined in the body 142, and an opposing, axially extending, laterally opening "L"-shaped groove or channel 146 defined in the body 142. The channel 146 is defined by a retainer wall or flange 152 and a ledge 150 (having an abutment face 150A). A radially extending access opening 156 is defined in the flange 152 and intersects the channel 146. The retention member 140 also has a "T"-shaped safety rail groove or channel 148 defined in a midsection of the body 142. The outer surface of the retention member 140 may be convex to generally match the curvature of the body member 120.

With reference to FIGS. 2 and 7, the safety rail member 160 has a lengthwise axis D-D and includes a body 162 having an inner section 162A and an outer section 162B on either side of a stop feature 165. Each section 162A, 162B has an axially extending rail feature 164 having a "T"-shaped cross-sectional profile. A retainer flange 166 extends axially the full length of the safety rail member 160.

The body member 120, the retention member 140 and safety rail 160 may be formed of any suitable material(s). According to some embodiments, the body member 120, the retention member 140 and the safety rail 160 are formed of a polymeric material or materials. According to some embodiments, the retention member 140 and the safety rail 160 are formed of polypropylene, ABS, or PVC. According to some embodiments, the body member 120 is formed of ABS.

According to some embodiments, the retention member 140 and the safety rail 160 each have a flexural modulus in the range of from about 1.90 GPa to 2.80 GPa. According to some embodiments, the body member 120 has a flexural modulus in the range of from about 1.90 GPa to 2.80 GPa.

According to some embodiments, the core body member 120, in cross-section, defines an arc of between about 348 and 352 degrees when the holdout device 100 is in its assembled or sleeve retaining position as shown in FIG. 5.

According to some embodiments, the nominal thickness T (FIG. 7) of the core body member 120 is in the range of from about 0.060 to 0.10 inch.

The body member 120, the retention member 140 and the safety rail 160 may each be formed by any suitable technique. According to some embodiments, the body member 120 is extruded and cut to length. According to some embodiments, the members 140, 160 are molded (e.g., injection molded). In some embodiments, the body member 120 is a unitary, monolithic structure. In some embodiments, the retention member 140 and the safety rail 160 are each unitary, monolithic structures.

When the holdout device 100 is assembled, the rail feature 164 of the safety rail member portion 162A is received in the channel 148 to form the retention assembly 111. In the retention assembly 111, the flange 166 combines with the flange 152 and the ledge 150 to convert the channel 146 to a laterally opening "U"-shaped channel 119. The edge section 133 is received in the channel 144. The edge section 135 is received in the channel 119 such that the edge 129 abuts the abutment face 150. The retention assembly 111 and the cooperating edge sections 127, 129 thereby serve as a releasable retention mechanism 101 as discussed below. The installed retention member 140 spans the axial side slit 130 so that the members 120, 140 collectively surround the passage 116 and the side slit 130 is closed.

According to some embodiments, the insertion depth of each edge section 133, 135 into its respective receiver channel 144, 146 is in the range of from about 0.25 to 0.50 inch.

The sleeve member 20 surrounds the holdout device 100 in a radially elastically expanded state as discussed above. As a result, the sleeve member 20 retains an elastic recovery force and applies a persistent radially compressive load on the holdout device 100 tending to force the free edges 127, 129 toward one another and the edge sections 133, 135 into their respective channels 144, 146. The engagement edge portion 129A is thereby forced into loaded abutment with the abutment face 150A as shown in FIG. 7. However, the cutout 132 spaces the recessed edge portion 129B a gap distance G3 (FIG. 8) from the abutment face 150A. The holdout device 100 is thereby maintained as a substantially rigid tube by the compression force of the sleeve member 20.

The section 117 of the holdout device 100 extends axially beyond the sleeve member 20 on one end to expose the opening 156 and the outer section 162B of the safety rail 160. The target region 136 and the indicator 138 are exposed through the opening 156. The target region 136 is located adjacent the free end 112 of the core 110.

The opening 156 and the target region 136 serve as a release mechanism 102. The release mechanism 102 can be used to selectively release the retention mechanism 101 and thereby actuate or trigger the core 110 to collapse under the load from the sleeve member 20.

The cover assembly 10 can be formed by any suitable method. According to some embodiments, the holdout device 100 is assembled by inserting the safety rail 160 into the slot 148 to form the retention assembly 112, and then inserting the retention assembly 112 into the slot 130 and as shown in FIG. 1. The holdout device 100 is mounted in the inner passage 26A of the sleeve member 20 such that the sleeve member 20 is in a radially expanded condition or state as compared to its relaxed state and its intended installed state. For example, the holdout device 100 can be installed in the sleeve member 20 by expanding the sleeve member 20, then inserting the holdout device 100 in the passage 26A, and thereafter releasing the sleeve member 20 to contract onto the holdout device 100. It will be appreciated that the elastically expanded sleeve member 20 applies a persistent radially compressive load (i.e., a recovery force) on the holdout device 100, and the holdout device 100 resists radial collapse of the core 110 due to this load. The holdout device 100 thereby serves as a supporting structure that resists radial contraction of the sleeve member 20. The cover assembly 10 may be stored, transported, etc. in this condition.

In general, the cover assembly 10 can be installed on a selected substrate Q (FIG. 10) as follows. The substrate Q is inserted into the passage 116 of the holdout device 100 with the holdout device 100 in the sleeve retaining position. The safety rail member 160 is withdrawn axially from the retention member 140, leaving the retention member 160 in place on the body member 120 and opening the channel 146 on the radially inward side. The core 110 will remain rigid and will not collapse. More particularly, the compression from the sleeve member 20 and the frictional engagement between the free edge portion 129A and the abutment face 150A will maintain the integrity of the core 110 unless and until the free edge portion 129A is forced out of engagement with the abutment face 150A.

Figure 8:
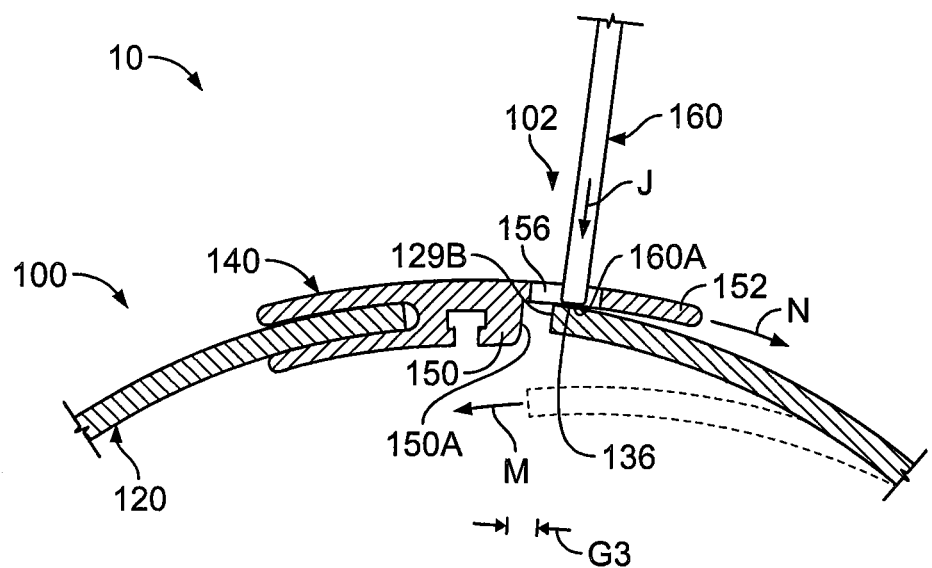
FIG. 8 is a fragmentary, cross-sectional view of the cover assembly of FIG. 5 taken along the line 8-8 of FIG. 5, wherein a safety rail member thereof is being used to apply a release force to the holdout device.

With reference to FIG. 8, an end 160A of the safety rail member 160 is then inserted in a direction J (generally radially and transverse to the axes A-A, B-B, C-C, E-E) through the opening 156 and into engagement with the target region 136 of the edge section 135. The installer may hold the safety rail 160 using a portion thereof distal from the end 160A so that the installer's hand is maintained a safe distance from the region of the slit 130. The installer then forces the end 160A against the target region 136 in the direction J to apply a release force and depress or deflect the target region 136 radially inwardly (generally in the direction J), and to in turn forcibly overcome frictional engagement between the free edge portion 129B and the abutment face 150A and deflect the free edge portion 129B and the edge section 135 radially inward as shown in FIG. 8 (in dashed lines) and in FIG. 9. A portion of the free edge portion 129B is thereby freed from the ledge 150 and the radially compressive load of the sleeve member 20 applied to the body member 120 will cause the remainder of the free edge portion 129B to come free of and clear the ledge 150.

With the free edge 129 dislodged from the retention member 140, the body member 120 is forced by the recovery force load of the sleeve member 20 to collapse circumferentially and radially, coil or roll up spirally as show in FIG. 10. That is, the free edge 127 and/or the free edge 129 travel in directions M, N relative to one another to progressively imbricate or overlap the core body member 120 onto itself. For example, as shown in FIG. 10, a longitudinally extending segment 106 of the body member 120 underlaps an opposing segment 108 of the core 110 extending from the ledge 150. Thus, the holdout device 100 shrinks (radially and circumferentially) in place. The cover assembly 10 is thereby deployed and the core 110 will remain a component (within the sleeve member 20) of the installation.

Figure 9:
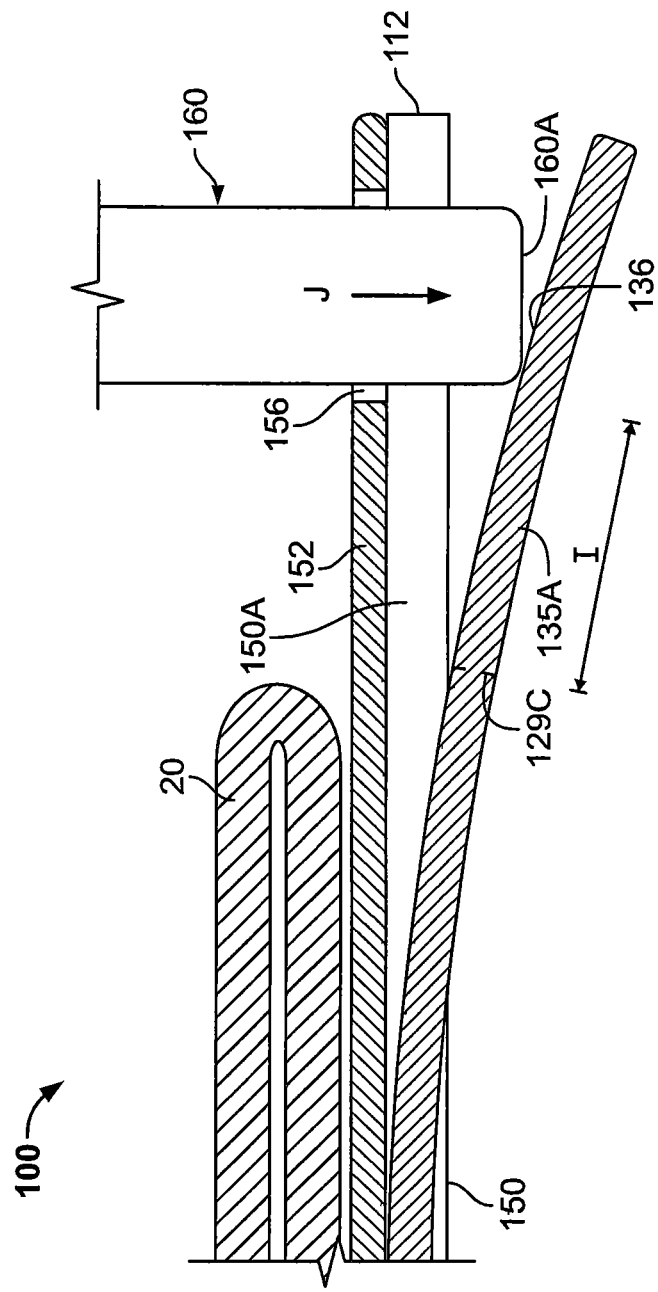
FIG. 9 is a fragmentary, cross-sectional view of the cover assembly of FIG. 5 taken along the line 9-9, wherein the safety rail member is being used to apply the release force to the holdout device.

The cutout 132 and spacing between the recessed edge portion 129B and the abutment face 150A reduce binding or resistance between the free edge 129 and the ledge 150 adjacent the target region 136 so that less force is required to initiate the release of the free edge 129. In some embodiments and as best seen in FIG. 9, the target region 136 is located proximate a free end of the core 110 and a distance I from the lead end 129C of the engagement edge portion 129A (i.e., the point at which the frictional engagement between the engagement edge portion 129A and the abutment face 150A begins). When the release force is applied to the target area 136 by the safety rail 160, the segment 135A of the edge section 135 along the recessed edge section 129B along the distance I provides leverage to overcome the frictional engagement between the engagement edge portion 129A and the abutment face 150B. That is, the segment 135A can be deflected without overcoming the friction resistance and will itself operate as a lever arm to provide mechanical advantage for breaking the lock between the engaged edge 129A and the ledge 150. According to some embodiments, the distance I is at least 0.625 inch and, in some embodiments, is in the range of from about 0.50 to 1.0 inch.

When the body member 120 is collapsed as described above, the indicator 138 will slide circumferentially away from the opening 156 so that it is no longer visible therethrough and the visually dissimilar region 139 is instead visible through the opening 156. In this way, the holdout device 100 can indicate (e.g., by changing the color displayed through the window or opening 156) to the installer that the holdout device 100 has been effectively actuated and collapsed.

With reference to FIG. 11, an installation and protected electrical connection 40 employing the cover assembly 10 is shown therein. The connection 40 is merely exemplary of some embodiments of the invention and includes an elongate electrical cable 42 and a busbar 50. The cable 42 has an electrical conductor 42A surrounded by an electrically insulating jacket 42B. The busbar 50 has an electrical conductor 50A surrounded by an electrically insulating jacket 50B. The conductors 42A, 52A are disconnectably terminated at a post 54 by a lug connector 42C affixed to the conductor 42A and a removable bolt 53 and mechanically and electrically coupled thereby. It may be desirable or necessary to apply an environmental protection cover such as the sleeve member 20 and an inner elastomeric sleeve member 30 over the cable 42 and the portions busbar 50. In some embodiments, strips of mastic or other sealant or gasket material may be provided about the cable 42 and the busbar 50 to provide an enhanced seal between the sleeve member 20 and/or the sleeve member 30 and the components 42, 50.

The inner sleeve member 30 is mounted (e.g., preinstalled at the factory) in the passages 116, 26A of the holdout device 100 and the sleeve member 20 to form a composite cover assembly 12. To install the composite cover assembly 12 on the connection 40, the installer first slides the cover assembly 12 over the cable 42 as shown in FIG. 11. In the supporting or sleeve retaining position as shown in FIG. 11, the nominal inner diameter of the core 110 is sized to allow the core 110 to be slid over the cable 42 and the busbar 50 without undue effort or damage to the cable 42. In some embodiments, a further holdout 60 (e.g., a spirally wound strip holdout) may be provided in the cover assembly 12 to hold a further portion of the sleeve member 20 in an expanded state.

The connection 40 is then formed as shown in FIG. 11. The cover assembly 12 is then slid over the connection 40 shown in FIG. 11. According to some embodiments, the inner diameter of the core 110 is sized to allow the core 110 to be slid over the connection 40 without undue effort or damage to the connection 40.

The safety rail member 160 is then withdrawn from the core 110 and used to trigger or actuate the holdout device 100 to close or collapse as described above. As a result, sleeve member 20 is no longer supported in the expanded condition by the core 110 and is permitted to partially or fully recover to a radially recovered condition or position with a reduced diameter. The radially compressive load of the sleeve member 20 is applied to the inner sleeve member 30 by the collapsed core 110. The inner sleeve member 30 in turn applies the load from the sleeve 20 onto the busbar 50. An extension portion 28 of the outer sleeve member 20 can then be folded or rolled axially out over the exposed portion of the core 110 and onto the adjacent portion of the busbar 50. The holdout 60 may be removed to permit the remainder of the sleeve member 20 to contract onto the cable 42.

Once installed, the inner sleeve 30 and/or the outer sleeve member 20 may form a seal with the cable 40 and the busbar 50. In some embodiments, the sleeve member 20 is configured so that, when installed on the connection 40, the recovered sleeve member 20 remains in a partially expanded position (as compared to its relaxed state) so that the sleeve member 20 continues to apply a persistent radially compressive load to the connection (e.g., to the busbar 50).

According to some embodiments, the sleeve member 20 as mounted on the holdout device 100 in the undeployed cover assembly 10 is expanded at least about 350% of its relaxed diameter. According to some embodiments, the sleeve member 20 is expanded between about 200 and 400% as compared to a relaxed diameter. According to some embodiments, when the core 110 is in the supporting position, the core 110 has a nominal inner diameter of between about 4 and 4.5 inches.

According to some embodiments, when the cover assembly 10 is deployed, the inner diameter of the core 110 is reduced by at least 10% of its inner diameter prior to collapse.

According to further embodiments, the end 22 of the sleeve member 20 may be closed to form a cap.

The cover assemblies provide an effective mechanism for applying a cold-applied or cold shrinkable cover onto an elongate substrate such as a cable, cable splice or cable termination. The holdout devices may provide improved reliability, improved convenience, and less craft sensitivity as compared to other holdout devices. The safety rail member 160 can serve as an integral actuator tool to provide the installer with mechanical advantage and to reduce risk to the installer. The provision of a designated target region 136 can assist the installer in locating the proper location to apply pressure to initiate release of the free edge 129. The indicator 138 can assist the installer in determining whether the holdout device 100 has been released. The designated target area and actuator tool can provide a consistent torque to overcome the force of friction between the free edge 129 and the ledge 150.

Various modifications may be made to the embodiments discussed above in accordance with the present invention. For example, the retention member 140 may be substantially permanently secured (e.g., glued or welded) to the edge section 133. In some embodiments, a tool other than the safety rail member 160 may be used to actuate the release mechanism 102.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A method for covering an elongate substrate, the method comprising: providing a cover assembly including:
    a holdout device including:
        a core having an axially extending slit defined therein and defining a core passage to receive the substrate; and a designated target region; and a resilient, elastically radially expanded sleeve member defining an axially extending sleeve passage, the sleeve member being mounted on the core such that the core is disposed in the sleeve passage and the sleeve member exerts a radially compressive recovery force on the core; mounting the cover assembly on the elongate substrate such that the elongate substrate extends through the core passage; and thereafter with the substrate disposed in the core passage, applying a radially directed release force to the target region, responsive to which the core reduces in circumference and collapses around the substrate under the recovery force of the sleeve member to a collapsed position; wherein applying the release force to the target region causes an axially extending first edge of the core to slide beneath an opposing axially extending second edge of the core, thereby allowing the core to curl upon itself under the recovery force; wherein the holdout device includes an access opening defined therein; and applying the release force to the target region includes applying the release force to the target region through the access opening.

2. The method of claim 1 wherein: the first edge is circumferentially loaded against the second edge by the recovery force, thereby creating a frictional resistance to disengagement between the first and second edges that is overcome by applying the release force to the target region; the first edge includes an engagement edge portion and a recessed edge portion; the engagement edge portion engages the second edge; and the recessed edge portion is circumferentially spaced apart from the second edge.

3. The method of claim 1 wherein:
the cover assembly includes an integral, removable safety rail mounted on the core, wherein the safety rail is configured to prevent collapse of the core until the safety rail is removed; and
the method includes:
removing the safety rail from the core; and thereafter using the safety rail to apply the release force to the target region.

4. The method of claim 1 wherein the second edge defines an axially extending ledge.

5. The method of claim 1 wherein: the core includes an axially extending edge section adjacent the slit and an axially extending flange overlapping the edge section; the target region is located on the edge section; and the access opening is defined in the flange.

6. The method of claim 5 wherein:
the core includes a body member and a separately formed retention member mounted on the core;
the flange forms a part of the retention member; and
the access opening is defined in the retention member.

7. The method of claim 1 wherein: the first edge is circumferentially loaded against the second edge by the recovery force, thereby creating a frictional resistance to disengagement between the first and second edges; and the method includes overcoming the frictional resistance to disengagement between the first and second edges by applying the release force to the target region.

8. The method of claim 7 wherein:
the first edge includes an engagement edge portion and a recessed edge portion;
the engagement edge portion engages the second edge; and
the recessed edge portion is circumferentially spaced apart from the second edge.

9. The method of claim 8 wherein the target region is located axially proximate the recessed edge portion.

10. The method of claim 1 including a status indicator to indicate to a user whether the core is in a retaining position or, alternatively, a collapsed position.

11. The method of claim 10 wherein the status indicator includes a color indicator.

12. The method of claim 1 wherein the axially extending slit extends the full length of the core and radially completely through a wall of the core.

13. A method for covering an elongate substrate, the method comprising:
providing a cover assembly including:
a holdout device including:
a core having an axially extending slit defined therein and defining a core passage to receive the substrate, the core being configured in a retaining position; and
a status indicator; and
a resilient, elastically radially expanded sleeve member defining an axially extending sleeve passage, the sleeve member being mounted on the core such that the core is disposed in the sleeve passage and the sleeve member exerts a radially compressive recovery force on the core;
mounting the cover assembly on the elongate substrate such that the elongate substrate extends through the core passage; and thereafter
with the substrate disposed in the core passage, applying a radially directed release force to the holdout device, responsive to which the core reduces in circumference and collapses around the substrate under the recovery force of the sleeve member to a collapsed position from the retaining position;
wherein the status indicator is operative to indicate to a user whether the core is in the retaining position or, alternatively, the collapsed position.

14. The method of claim 13 wherein the status indicator includes a color indicator.

15. A method for covering an elongate substrate, the method comprising: providing a cover assembly including: a holdout device including a core having an axially extending slit defined therein and defining a core passage to receive the substrate; and a resilient, elastically radially expanded sleeve member defining an axially extending sleeve passage, the sleeve member being mounted on the core such that the core is disposed in the sleeve passage and the sleeve member exerts a radially compressive recovery force on the core; mounting the cover assembly on the elongate substrate such that the elongate substrate extends through the core passage; and thereafter with the substrate disposed in the core passage, applying a radially directed release force to the holdout device, responsive to which the core reduces in circumference and collapses around the substrate under the recovery force of the sleeve member to a collapsed position; wherein: the release force applied to the holdout device causes an axially extending first edge of the core to slide beneath an opposing axially extending second edge of the core, thereby allowing the core to curl upon itself under the recovery force; the first edge is circumferentially loaded against the second edge by the recovery force, thereby creating a frictional resistance to disengagement between the first and second edges that is overcome by applying the release force to the holdout device; the first edge includes an engagement edge portion extending along a first axial extent of the first edge and a recessed edge portion extending along a second axial extent of the first edge different from the first axial extent; the engagement edge portion engages the second edge and is circumferentially loaded against the second edge by the recovery force until the release force is applied to the holdout device; and the recessed edge portion is circumferentially spaced apart from the second edge and defines a recess between the second edge and the recessed edge portion.

16. The method of claim 15 wherein:
the holdout includes a designated target region;
when the substrate is disposed in the core passage and a radially directed release force is applied to the target region, the core will reduce in circumference and collapse around the substrate under the recovery force of the sleeve member to the collapsed position; and the target region is located axially proximate the recessed edge portion.

17. The method of claim 16 wherein the recess and the target region are located proximate a terminal axial end of the core.

18. The method of claim 17 wherein the recess extends axially from the engagement edge portion to the terminal axial end of the core.

19. The method of claim 15 wherein the recess extends axially from the engagement edge portion to a terminal axial end of the core.

* * * * *